United States Patent
Itoh et al.

(10) Patent No.: US 7,967,452 B2
(45) Date of Patent: Jun. 28, 2011

(54) PROJECTION TYPE DISPLAY APPARATUS

(75) Inventors: Tatsuo Itoh, Osaka (JP); Kazuhisa Yamamoto, Osaka (JP); Kenichi Kasazumi, Osaka (JP); Kiminori Mizuuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 658 days.

(21) Appl. No.: 12/064,784

(22) PCT Filed: Aug. 24, 2006

(86) PCT No.: PCT/JP2006/316643
§ 371 (c)(1),
(2), (4) Date: Feb. 25, 2008

(87) PCT Pub. No.: WO2007/023916
PCT Pub. Date: Mar. 1, 2007

(65) Prior Publication Data
US 2009/0262262 A1    Oct. 22, 2009

(30) Foreign Application Priority Data
Aug. 26, 2005    (JP) ................... 2005-245603

(51) Int. Cl.
*G03B 21/28* (2006.01)

(52) U.S. Cl. ............... 353/99; 353/30; 353/31; 353/38; 353/98; 353/119; 353/122; 359/239; 359/242; 359/245; 359/246; 359/277; 359/649; 359/619; 359/621; 359/622; 359/625; 359/626; 359/707; 372/29.01; 372/29.014; 372/29.015; 372/38.07; 372/29.011; 372/29.02; 372/38.01; 455/556.1; 455/66.1

(58) Field of Classification Search .............. 353/30, 353/31, 38, 98, 99, 119, 122; 372/29.01, 372/29.014, 29.015, 38.02, 38.07, 29.011, 372/29.02, 38.01, 39, 43.01; 359/239, 242, 359/245, 246, 277, 649; 455/556.1, 66.1
See application file for complete search history.

(56) References Cited

U.S. PATENT DOCUMENTS
| | | | |
|---|---|---|---|
| 5,642,448 A * | 6/1997 | Pan et al. | 385/31 |
| 5,900,981 A * | 5/1999 | Oren et al. | 359/619 |
| 6,002,505 A | 12/1999 | Kraenert et al. | |
| 6,594,090 B2 * | 7/2003 | Kruschwitz et al. | 359/707 |

(Continued)

FOREIGN PATENT DOCUMENTS
JP    9-311255    12/1997

(Continued)

OTHER PUBLICATIONS
International Search Report issued Oct. 31, 2006 in the International (PCT) Application No. PCT/JP2006/316643.

(Continued)

*Primary Examiner* — Georgia Y Epps
*Assistant Examiner* — Sultan Chowdhury
(74) *Attorney, Agent, or Firm* — Wenderoth, Lind & Ponack, L.L.P.

(57) ABSTRACT

A projection type display apparatus is provided that is safe even when a person looks directly into a laser beam. A laser operation control unit sets the output power of at least one laser source so that intensity A ($mW/mm^2$) of the laser beam on at least one spatial light modulation element satisfies relationship of $A < 686 \times B^2$ when numerical aperture B on image side of an illumination optics system is set.

20 Claims, 9 Drawing Sheets

U.S. PATENT DOCUMENTS

| | | | |
|---|---|---|---|
| 6,874,893 B2 | 4/2005 | Park | |
| 2001/0053165 A1* | 12/2001 | Wang et al. | 372/38.02 |
| 2002/0085286 A1* | 7/2002 | Drodofsky et al. | 359/619 |
| 2004/0012710 A1* | 1/2004 | Yaji et al. | 348/362 |
| 2004/0189589 A1 | 9/2004 | Park | |
| 2004/0189955 A1 | 9/2004 | Park | |
| 2004/0224722 A1* | 11/2004 | Lee | 455/556.1 |
| 2006/0158725 A1* | 7/2006 | Yamamoto et al. | 359/449 |
| 2009/0196146 A1* | 8/2009 | Hotta et al. | 369/109.01 |

FOREIGN PATENT DOCUMENTS

| | | |
|---|---|---|
| JP | 11-109185 | 4/1999 |
| JP | 2994469 | 10/1999 |
| JP | 2002-214706 | 7/2002 |
| JP | 2004-234001 | 8/2004 |
| JP | 2004-317638 | 11/2004 |
| JP | 2004-341210 | 12/2004 |
| JP | 2005-31244 | 2/2005 |
| JP | 2005-114985 | 4/2005 |

OTHER PUBLICATIONS

JIS C 6802:1997, "Safety of laser products", Japanese Standards Association, Jan. 31, 1998, pp. 1-42.

Japanese Office Action issued Jan. 25, 2011 in Japanese Application No. 2007-532182 (full English language translation provided).

JIS C 6802:2005, "Safety Standards of Laser Products", Japanese Standards Association, Jan. 20, 2005 (partial English language translation provided).

* cited by examiner

PROJECTION TYPE DISPLAY APPARATUS

TECHNICAL FIELD

The present invention relates to a projection type display apparatus that projects a laser beam modulated in accordance to input information such as video information and/or character information onto a screen.

BACKGROUND ART

A projection type display apparatus and a rear projection type display apparatus are among the known large-screen display apparatuses. While these apparatuses have used high-pressure mercury lamps as a light source, research has been going to develop a projection type display apparatus that uses laser beams of three primary colors for the reasons of better color reproduction performance and less power consumption. Unlike the light emitted by a high-pressure mercury lamp, a laser beam is a coherent and monochromatic light and therefore has a possibility of getting focused at a point on the retina of a human eye and impairing the retina. For this reason, products using lasers are classified according to the international standard IEC60825 or, in Japan, by JIS C6802: 2005, that stipulates guidelines for each class of products to be observed by manufacturers and users, to ensure the safe use of laser products.

JIS C6802: 2005 defines a term "maximum permissible exposure (MPE)" that specifies the values of intensity, wavelength, laser source size, duration of exposure, human body tissue that may be damaged by the laser beam, pulse width and other parameters that ensure that the laser beam does not harm a human body when exposed to a beam under normal operating environment. The MPE is determined by a working group of the International Electrotechnical Commission (IEC), based on information obtained from cases of accidents involving lasers and experimental studies using animals. A projection type display apparatus of the prior art has been provided with such safety measures as the intrusion of person into a region of picture projection is detected so as to shut down the laser output or decrease the output power thereof to a safe level below the MPE value, to prevent the human retina from being impaired by direct irradiation with the laser beam (for example, refer to Japanese Patent No. 2994469).

The following problems exist with the configuration of the prior art described above.

Firstly, since the laser output power is decreased upon detection of human intrusion into the region of picture projection, emission of laser beam of high output power may remain uninterrupted, if the intrusion detecting system fails or, even if the intrusion detecting system functions, if there is trouble in the unit of the laser shutdown system. Such a failure may allow a person to approach the projection type display apparatus and look into the laser beam resulting in the impairment of the retina.

Secondly, not only projection type display apparatuses, but also any apparatus that employs laser has an interlock to disable laser emission when a casing is opened to make access to the laser source, thereby ensuring safety. However, there remains a possibility of the laser source being removed from the apparatus and used for unintended purpose by an individual with malicious intent.

SUMMARY OF THE INVENTION

The present invention aims at solving the problems described above. An object of the present invention is to provide a projection type display apparatus that is safe even when a person looks directly at the laser beam.

In order to attain the aforementioned object, the projection type display apparatus of the present invention comprises at least one laser source, an illumination optics system, at least one spatial light modulation element, a projection optics system and a laser operation control unit. The illumination optics system directs the laser beam emitted by the laser source to at least one spatial light modulation element. At least one spatial light modulation element modulates the intensity of the laser beam received from the illumination optics system in accordance to the input information. The projection optics system projects the laser beam modulated by the spatial light modulation element onto a screen. When a numerical aperture B of the illumination optics system is set, the laser operation control unit controls the output power of at least one laser source so that intensity A (mW/mm$^2$) of the laser beam satisfies a relationship of $A<686\times B^2$ on the spatial light modulation element.

DETAILED DESCRIPTION OF THE INVENTION

Now the present invention will be described by way of embodiments with reference to the accompanying drawings.

First Embodiment

Figure 1:
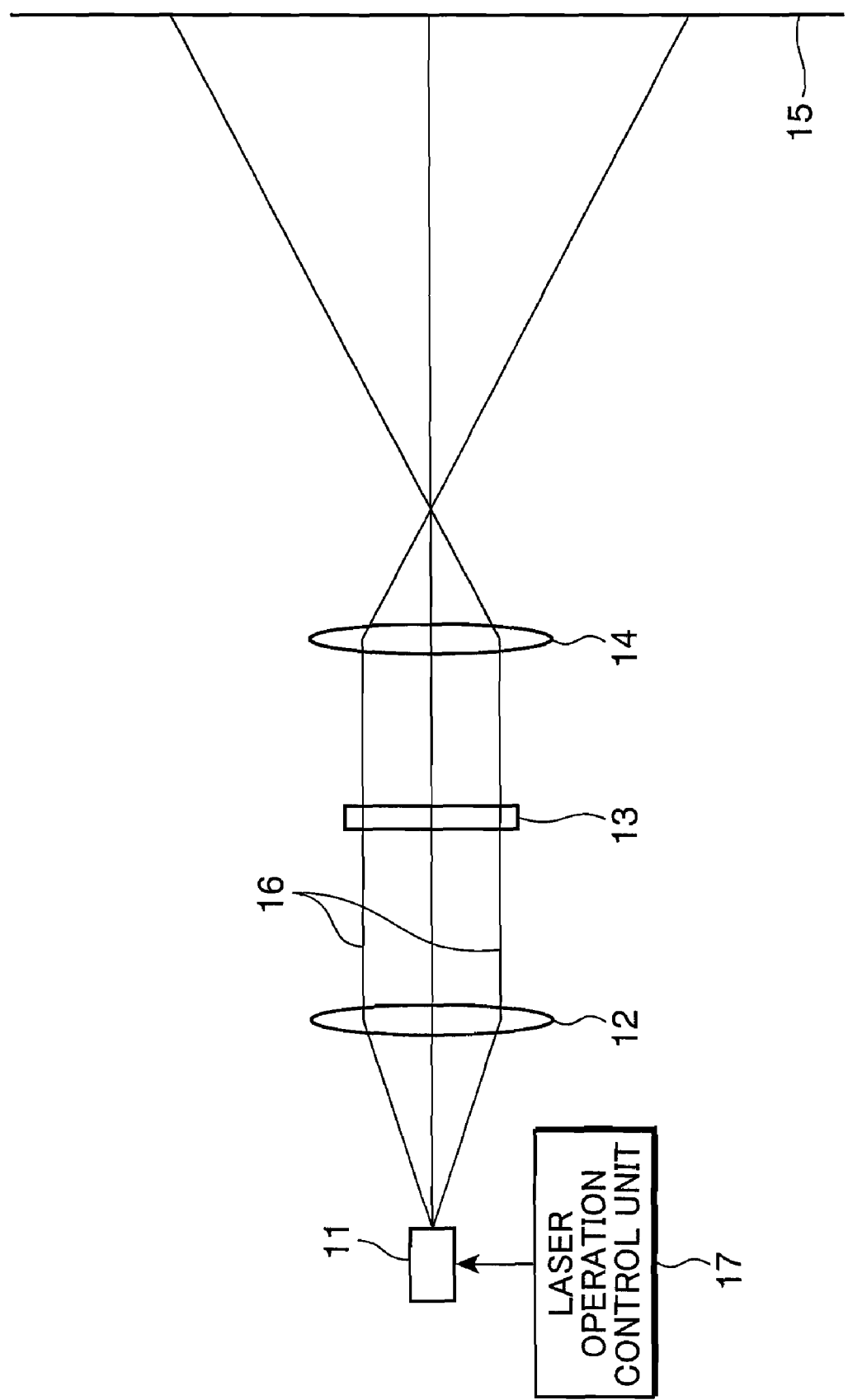
FIG. 1 shows the schematic configuration and optical path of a projection type display apparatus according to first embodiment of the present invention.

FIG. 1 shows the schematic configuration and optical path of the projection type display apparatus according to the first embodiment of the present invention. Note that in the first embodiment, one laser source that emits a laser beam of a single wavelength or a plurality of laser beams of different wavelengths, and one transmission type spatial light modulation element that receives at least one laser beam emitted by an illumination optics system are used.

In FIG. 1, reference numeral 11 denotes the laser source that is composed of a semiconductor laser or a semiconductor laser-excited solid state laser that emits a laser beam of a single wavelength or a plurality of different wavelengths. Reference numeral 12 denotes the illumination optics system composes of a beam homogenizer such as fly-eye lens or rod integrator and a relay optics system that projects the laser beam conditioned to have a uniform intensity distribution of rectangular or linear profile by the beam homogenizer. It is preferable to provide a diffuser plate in the illumination optics system 12 to achieve uniform intensity distribution of the laser beam. Reference numeral 13 denotes the spatial light modulation element. The spatial light modulation element 13 modulates the intensity of the laser beam emitted by the illumination optics system 2 according to the input information such as video information or character information. Reference numeral 14 denotes the projection optics system that projects the laser beam modulated by the spatial light modulation element 13 onto a screen 15. Reference numeral 16 denotes the laser beam. Reference numeral 17 denotes the laser operation control unit that controls the output power of the laser source 11 by adjusting the current supplied to the laser source 11.

Now the operation of the projection type display apparatus shown in FIG. 1 will be briefly described. When the laser operation control unit 17 supplies a current to the laser source 11, the laser source 11 emits the laser beam 16 conditioned by the illumination optics system 12 into a beam having predetermined intensity distribution and conversion angle and is directed to the spatial light modulation element 13. The predetermined intensity distribution means to irradiate the spatial modulation region of the spatial light modulation element 13 substantially uniformly. The predetermined conversion angle is equal to the numerical aperture on the image side of the illumination optics system 12 and is substantially equal to the numerical aperture on the object side of the projection optics system 14. The laser beam 16 modulated by the spatial light modulation element 3 in accordance to video information, for example, is enlarged and projected by the projection optics system 14 onto the screen 15. Reflection or scattering of the laser beam 16 by the screen 15 makes the video image visible to the viewer.

Figure 2:
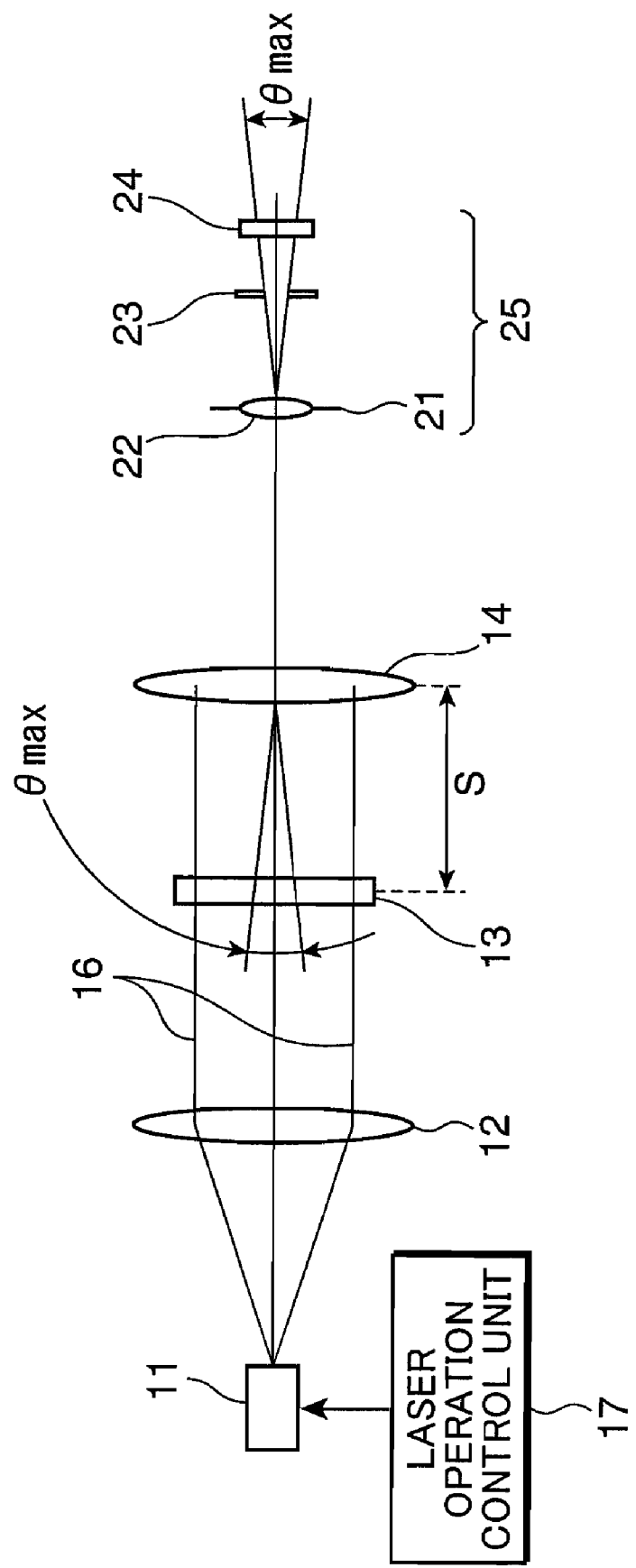
FIG. 2 shows a light intensity computation model and optical path of the projection type display apparatus according to a first embodiment of the present invention.

FIG. 2 shows a light intensity computation model and optical path of the projection type display apparatus. In FIG. 2, components identical to those shown in FIG. 1 will be denoted by the same reference numerals. Therefore, descriptions thereof will be omitted. In FIG. 2, reference numeral 21 denotes an aperture of an aperture plate of 7 mm in diameter. The diameter of the aperture 21 is determined to match the diameter of the human iris. Reference numeral 22 denotes a lens that is closely fitted in the aperture 21. Reference numeral 23 denotes a field stop that is a plate having a hole formed therein. The field stop 23 is placed in the focal plane of the lens 22. The hole of the field stop 23 is formed with a diameter equal to 0.1 times the focal length f of the lens 22, so as to make it possible to allow a part of the light transmitted through the lens 22, that is within a field of view angle of 0.1 radian ($\theta$ max), to pass through the field stop 23. Reference numeral 24 denotes a light detector that measures the intensity of light transmitted through the field stop 23. Reference numeral 25 denotes light intensity measuring optic system that comprises the aperture 21, the lens 22, the field stop 23 and the light detector 24. Light exposure on a human eye can be determined by measuring the intensity of the laser beam 16 by means of the light intensity measuring optic system 25. Light exposure will be discussed below with reference to FIG. 2.

When a person looks at a laser beam, that person blinks in a reflex movement due to aversive reaction, or turns the eyes away from the laser beam for protection. It is said that this reflex movement takes a period of 0.25 seconds. The value of MPE of laser beam that can be safely received on the eye for a period of 0.25 seconds is specified as follows (refer to JIS C6802: 2005, p 41, Table 6), based on information obtained from cases of accidents involving laser and experimental studies conducted on animals.

$$6.4 \times (C6)(J/m^2) = 25.6 \times 10^3 \times (C6)(mW/m^2) \quad \text{(Equation 1)}$$

C6 in Equation 1 is a correction factor determined by the size of the light source as viewed by the person. The size of the light source is given in terms of the solid angle (radian) extended by the laser source on the eye of the person who sees the laser beam. When size of the light source exceeds a threshold, the MPE becomes independent of the size of the light source. The threshold is the maximum field of view angle ($\theta$ max), and is set to 0.1 radians. A value of C6 is given by the field of view angle of the light source divided by 0.0015 radians, and C6 takes the maximum value of 66.7 when the field of view angle of the light source become maximum.

The power of a laser beam incident on the light detector 24 coming from a point on the spatial light modulation element 13 is a product of the proportion of overlapping of the luminous flux projected by the projection optics system 14 onto the screen 15 and the aperture 21 and the power of the laser beam emitted from the point described above. Since the maximum field of view angle considered when ensuring safety of the laser beam is set to 0.1 radians, permissible light exposure can be determined by the computation described above for the laser beam emerging from a region of the spatial light modulation element 13 corresponding to the maximum field of view of 0.1 radians.

The surface area of the iris having a diameter of 7 mm, is $\pi \times (3.5 \times 10^{-3})^2 m^2$. Therefore, the power of the laser beam corresponding to the value of MPE of a laser beam that can be safely received on the eye for a period of 0.25 seconds is given by substituting 66.7 for C6 in the equation (1) and multiplying the area of the iris, and is determined as 66 mW.

The region of the spatial light modulation element 13 that corresponds to the maximum field of view of 0.1 radians is a circular region having diameter of 0.1×S, where S (mm) is the distance between the spatial light modulation element 13 and the projection optics system 14. Accordingly, the power of the laser beam emitted from the region of the spatial light modulation element 13 corresponding to the maximum field of view of 0.1 radians is given in terms of the intensity A (mW/mm$^2$) of the laser beam on the spatial light modulation element 13 as follows.

$$\pi \times (0.05 \times S)^2 \times A \quad \text{(Equation 2)}$$

The beam angle of a conical divergent beam emerging from a point on the spatial light modulation element 13 is equal to the numerical aperture B on the image side of the illumination optics system 12, and therefore a radius of a converging beam, that emerges from the projection optics system 14, on the iris surface is approximately given as S×B. Thus, the proportion of the area of iris to the sectional area of the converging beam is given as follows.

$$\pi \times (3.5)^2 / \pi \times (S \times B)^2 = (3.5/(S \times B))^2 \quad \text{(Equation 3)}$$

Maximum power of laser beam entering the iris is a product of Equation 2 and Equation 3, and is given by the following Equation 4.

$$\pi \times (0.05 \times S)^2 \times A \times (3.5/(S \times B))^2 \quad \text{(Equation 4)}$$

Since the power of the laser beam corresponding to the value of MPE of a laser beam emitted by a laser source having maximum field of view of 0.1 radians that can be safely received on the eye for a period of 0.25 seconds without harm is 66 mW as described above, the laser operation control unit 17 sets the output power of the laser source 11 so as to satisfy the following relationship:

$$\pi \times (0.05 \times S)^2 \times A \times (3.5/(S \times B))^2 < 66$$

namely, $$A < 686 \times B^2 \quad \text{(Equation 5)}$$

According to the first embodiment, as described above, the projection type display apparatus that is capable of preventing impairment of the retina in conjunction with the human reflex movement can be provided.

Second Embodiment

Figure 3:
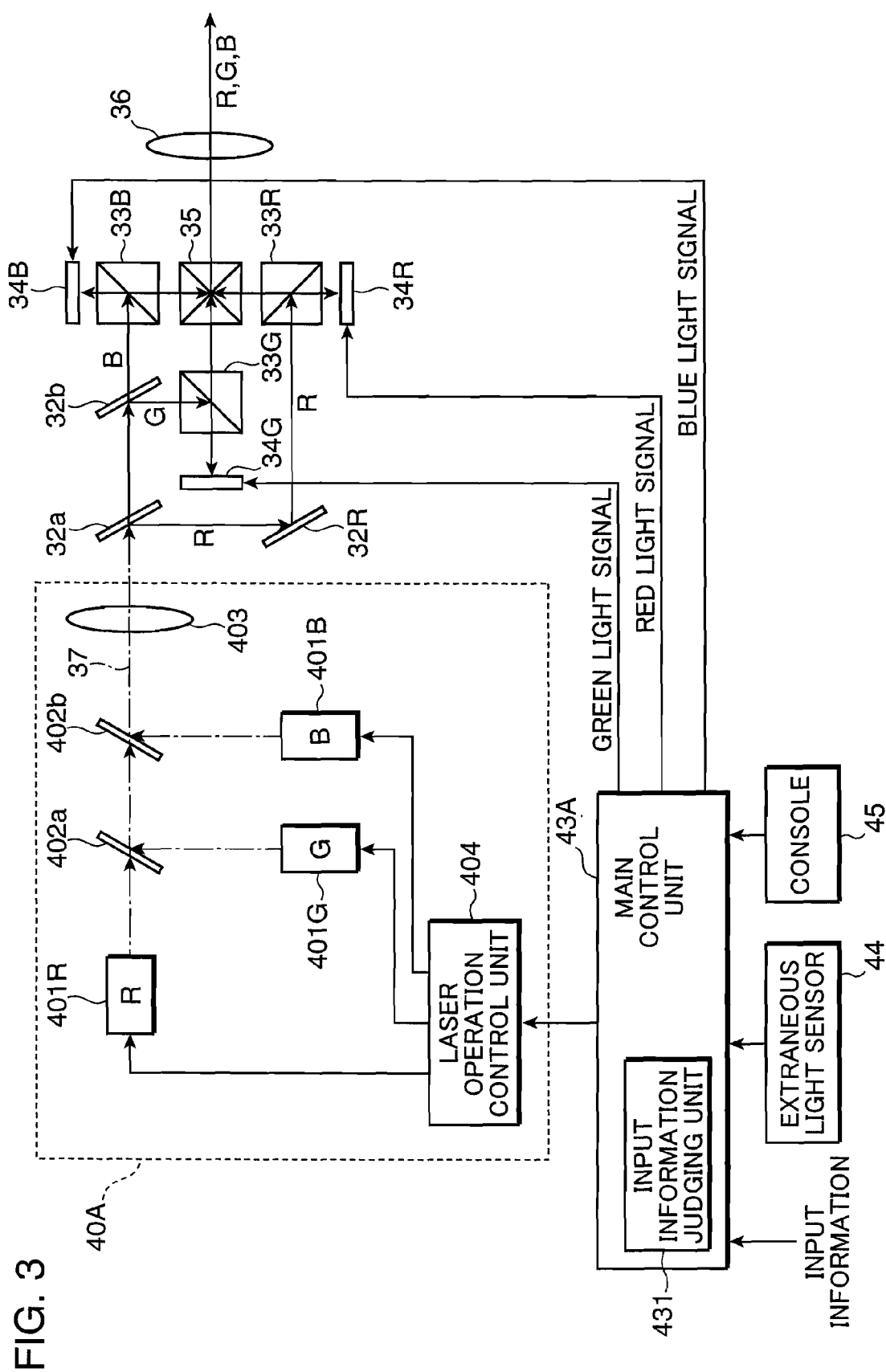
FIG. 3 shows the schematic constitution and optical path of a projection type display apparatus according to a second embodiment of the present invention.

FIG. 3 shows the schematic configuration and optical path of projection type display apparatus according to second embodiment of the present invention. The second embodiment employs three laser sources that emit three laser beams of different wavelengths and three reflection type spatial light modulation elements that receive the three laser beams emitted by the illumination optics system.

In FIG. 3, reference numerals 401R, 401G and 401B denote the laser sources that emit red, green and blue laser beams, respectively. Reference numeral 402a denotes a dichroic mirror that transmits red laser beam and reflects green laser beam, and 402b denotes a dichroic mirror that transmits red laser beam and green laser beam and reflects blue laser beam. Reference numeral 404 denotes a laser operation control unit that adjusts the currents supplied to the laser sources 401R, 401G and 401B of the three primary colors to control the output power of each laser source. Reference numeral 403 denotes an illumination optics system that projects the laser beams of the three primary colors with aligned optical axes emerging from the dichroic mirror 402b. The laser sources 401R, 401G and 401B of the three primary colors, the dichroic mirrors 402a, 402b, the illumination optics system 403 and the laser operation control unit 404 are housed in a laser unit 40A.

Reference numerals 32a and 32b denote the dichroic mirrors that reflect laser beams of particular wavelengths and transmit laser beams of other wavelengths. Reference numeral 32R denotes a mirror. Reference numerals 33G, 33B and 33R denote polarizing beam splitters provided for the green laser beam, blue laser beam and red laser beam, respectively. Reference numerals 34G, 34B and 34R denote reflection type spatial light modulator elements that receive the green laser beam, blue laser beam and red laser beam, respectively, and are preferably constituted from reflection type liquid crystal panel or micro mirror array. Reference numeral 35 denotes a polarizing dichroic prism, and 36 denotes a projection lens. Reference numeral 37 denotes laser beams of the three primary colors.

Reference numeral 43A denotes a main control unit that controls the operations of the projection type display apparatus as a whole and also switches the power control mode of the laser operation control unit 404 in accordance to a signal entered from the outside. The main control unit 43A includes an input information judging unit 431 that determines whether information input from the outside is video information or character information. The video information here refers to the information that represents static pictures or moving pictures of monochrome or multi-color representation and three values or more, and the character information refers to picture information that represents monochromatic and digital pictures obtained by converting character code.

Reference numeral 44 denotes an extraneous light sensor that measures the luminance of light components of the three primary colors included in the extraneous light. Reference numeral 45 denotes a console that allows a user to make various settings and operations.

In FIG. 3, when the laser operation control unit 404 supplies the currents to the laser sources 401R, 401G and 401B of the three primary colors, the red laser source 401R emits a red laser beam, the green laser source 401G emits a green laser beam and the blue laser source 401B emits blue laser beam. The laser beams 37 that have been emitted by the laser sources 401R, 401G and 401B of the three primary colors and have transmitted through the dichroic mirror 402b are directed by the illumination optics system 403 to the dichroic mirror 32a. Among the laser beams 37 of the three primary colors, only the red laser beam is reflected by the dichroic mirror 32a. The reflected red laser beam is reflected by the mirror 32R, then reflected by the polarizing beam splitter 33R to enter the reflection type spatial light modulator element 34R. Of the red laser beam that has been modulated and reflected by the reflection type spatial light modulator element 34R, only the component of which polarizing plane has rotated by 90 degrees transmits through the polarizing dichroic prism 35. The red laser beam that has transmitted through the polarizing beam splitter 33R is reflected by the polarizing dichroic prism 35 to be projected by the projection optics system 36 onto a screen, not shown.

Among the laser beams 37 of the three primary colors, the blue laser beam transmits through the dichroic mirrors 32a and 32b and is then reflected by the polarizing beam splitter 33B. Then after being modulated and reflected by the reflection type spatial light modulator element 34B, the blue laser beam transmits the polarizing beam splitter 33B and is reflected by the polarizing dichroic prism 35 thereby entering the projection optics system 36.

Among the laser beams 37 of the three primary colors, the green beam transmits through the dichroic mirror 32a and is then reflected by the dichroic mirror 32b and then by the polarizing beam splitter 33G to enter the reflection type spatial light modulator element 34G. After being modulated and reflected by the reflection type spatial light modulator element 34G, the green laser beam transmits through the polarizing beam splitter 33G and the polarizing dichroic prism 35 thereby to enter the projection optics system 35.

The reflection type spatial light modulator elements 34G, 34B and 34R receive green component signal, blue component signal and red component signal, that have been obtained by processing the input information for the respective colors, supplied from the main control unit 43A. The reflection type spatial light modulator elements 34G, 34B and 34R then modulate the green laser beam, the blue laser beam and the red laser beam according to the green component signal, the blue component signal and the red component signal, respectively.

In the projection type display apparatus of the second embodiment, the output powers of the red laser source, the green laser source and the blue laser source are determined according to the luminous efficiency of each color on the human eye, so as to provide such proportions of the output powers that the laser beams of three primary colors emitted at the same time would be recognized as white light by the human eye. In the second embodiment, the laser operation control unit 404 sets the output powers of the laser sources 401G, 401B and 401R of the three primary colors (first power control mode) so that the intensity Ag of the laser beam on the reflection type spatial light modulator element 34G, the intensity Ab of the laser beam on the reflection type spatial light modulator element 34B, the intensity Ar of the laser beam on the reflection type spatial light modulator element 34R and the numerical aperture B of the illumination optics system 31 satisfy the relationship (Ag+Ab+Ar) (686×B$^2$, that is based on Equation 5. As a result, the projection type display apparatus capable of preventing the retina from being impaired in conjunction with the human reflex movement and allows it to easily control the color balance between light components of different wavelengths can be provided.

Among the green laser beam, the blue laser beam and the red laser beam, the green laser beam has the highest luminous efficiency. Therefore, the laser operation control unit 404 may also set the output power of the green laser source 401G so that only the intensity Ag of the green laser beam on the reflection type spatial light modulator element 34G satisfies the relationship Ag<686×B$^2$, while shutting down the oscillation of the red laser source 401R and the blue laser source 401B (second power control mode). This mode provides the projection type display apparatus that has improved contrast and higher luminance, although the picture is monochromatic (green).

In case the input information judging unit 431 determines that the input information is video information, the main control unit 43A sends a command to the laser operation control unit 404 to select the first power control mode. In case the input information judging unit 431 determines that the input information is character information, the main control unit 43A sends a command to the laser operation control unit 404 to select the second power control mode. This enables it to automatically select either video display of good color balance or character display of good contrast.

The main control unit 43A also sends a command to the laser operation control unit 404 to decrease the output power of the laser source that emits the laser beam of a color of the highest luminance detected by the extraneous light sensor 44, among the laser beams of the three primary colors, in accordance to the luminance detected by the extraneous light sensor 44 (third power control mode). This makes it possible to improve the contrast according to the color balance of the extraneous light.

The main control unit 43A further sends a command to the laser operation control unit 404 to select the first power control mode, the second power control mode or the third power control mode, in accordance to the command entered by the user via the console 45. This makes it possible for the user to instruct via the console 45 to freely select either video display of good color balance or character display of good contrast, whether to display video image and/or characters with improved contrast in accordance to the color balance of the extraneous light.

For the reflection type spatial light modulator elements 34G, 34B and 34R, reflection type liquid crystal panel or micro mirror array may be used. When a transmission type liquid crystal panel is used as the spatial light modulation element, output power of the light source increases due to lower numerical aperture, and therefore the apparatus tends to become larger, thus making it impossible to obtain a compact projection type display apparatus. In the second embodiment, however, use of the reflection type spatial light modulator element of higher numerical aperture as the spatial light modulation element makes it possible to provide a compact and safe projection type display apparatus.

Third Embodiment

The third embodiment has a configuration that is capable of preventing the laser source from being removed from the apparatus and used in an unintended purpose, as well as preventing impairment of the retina in conjunction with the human reflex movement. According to the third embodiment, three laser sources that emit three laser beams of different wavelengths and one transmission type spatial light modulation element which receives the three laser beams emitted by the illumination optics system are used.

Figure 4:
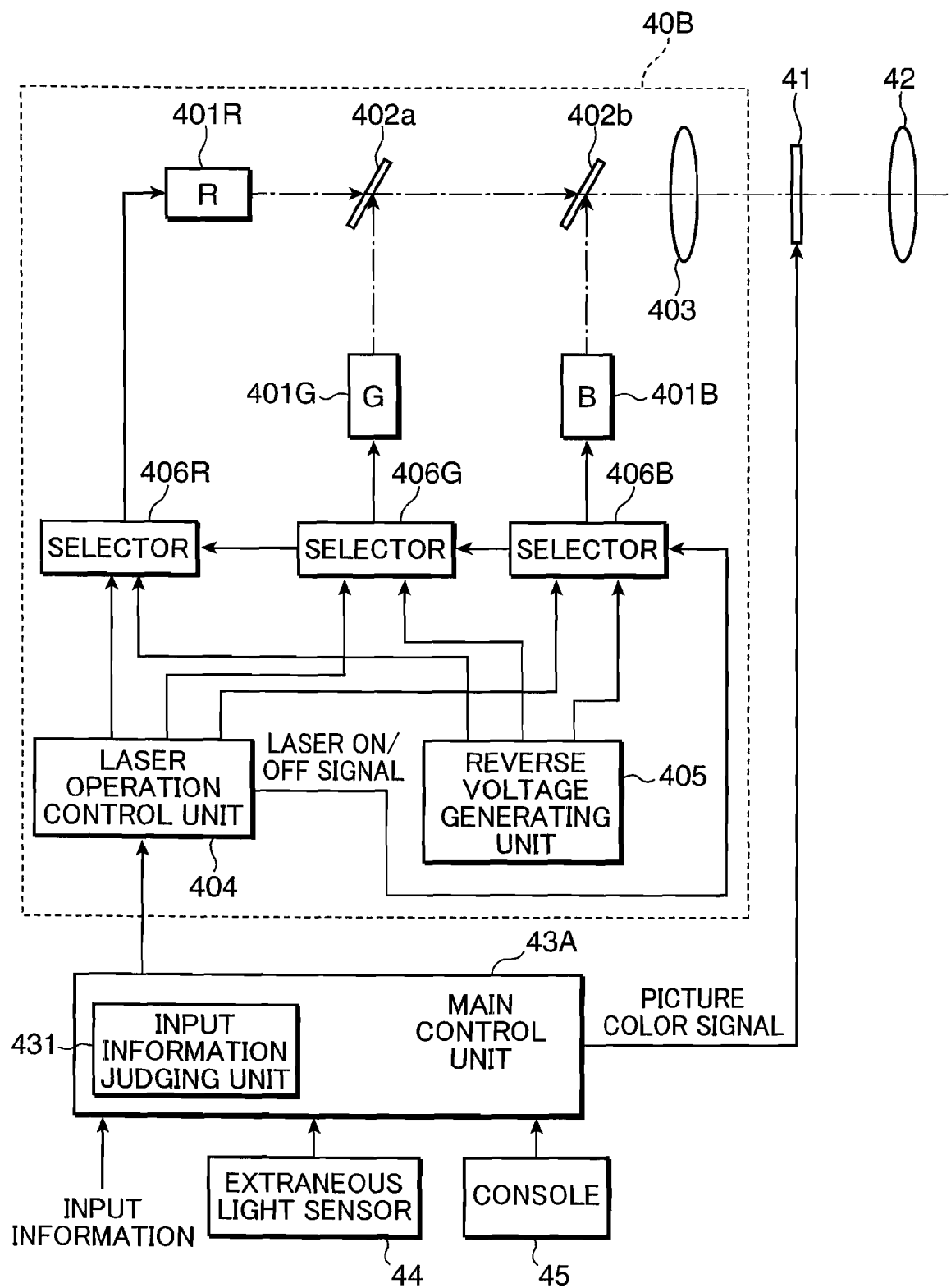
FIG. 4 shows the schematic configuration and optical path of a projection type display apparatus according to a third embodiment of the present invention.

FIG. 4 shows the schematic configuration and optical path of the projection type display apparatus according to the third embodiment of the present invention. In FIG. 4, components having a configuration and function identical to those shown in FIG. 3 referred to in the second embodiment will be denoted using the same reference numerals and descriptions thereof will be omitted. The description that follows will focus on the differences from the second embodiment.

In FIG. 4, the projection type display apparatus of the third embodiment comprises a laser unit 40B, a transmission type spatial light modulation element 41, a projection optics system 42, the main control unit 43A, the extraneous sensor 44 and the console 45. The laser unit 40B, the transmission type spatial light modulation element 41 and the projection optics system 42 are housed in a casing, not shown, in FIG. 4 but will be described below with reference to FIG. 5A and FIG. 5B.

The laser unit 40B houses the laser sources 401R, 401G and 401B that are configured from semiconductor lasers of the three primary colors, dichroic mirrors 402a, 402b, an illumination optics system 403, the laser operation control unit 404, a reverse voltage generating unit 405 and selectors 406R, 406G and 406B. The reverse voltage generating unit 405 and the selectors 406R, 406G and 406B that characterize the constitution of the third embodiment will be described below.

The reverse voltage generating unit 405 generates a reverse voltage (for example, 2 to 5 volts) that is equal to or higher than the breakdown voltage of the laser sources 401R, 401G and 401B and applies the voltage to the laser sources 401R, 401G and 401B of the three primary colors, when the laser unit is disconnected from the casing. The breakdown voltage is a reverse voltage that is higher than the maximum rated reverse voltage of the semiconductor laser.

The selectors 406R, 406G and 406B operate in accordance to laser ON/OFF signal from the laser operation control unit 404, so as to connect the laser operation control unit 404 to the laser sources 401R, 401G and 401B of the three primary colors when the laser sources are operating, and connect the reverse voltage generating unit 405 to the laser sources 401R, 401G and 401B of the three primary colors when the laser sources are not operating.

Figure 5A:
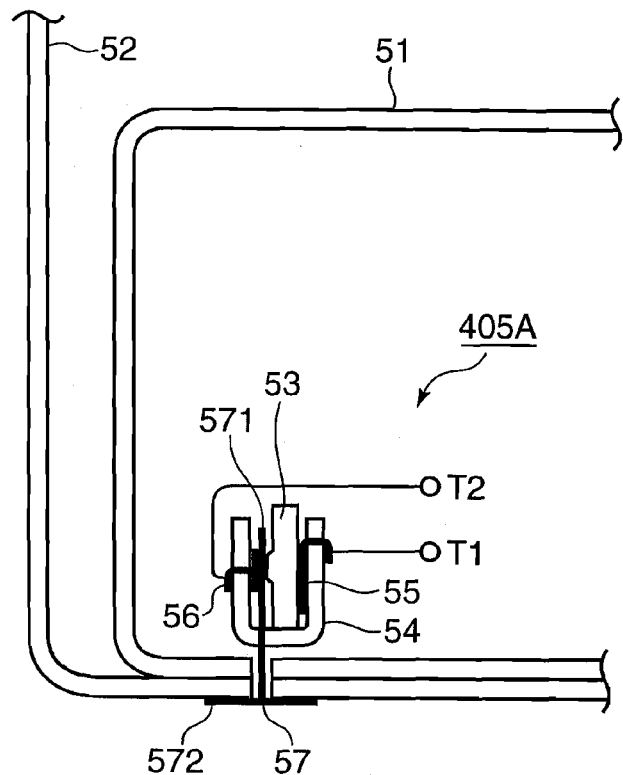
FIG. 5A shows the configuration of an example of a reverse voltage generating circuit of the projection type display apparatus according to a third embodiment of the present invention.

FIG. 5A shows the configuration of an example of the reverse voltage generating unit 405 shown in FIG. 4. In FIG. 5A, reference numeral 51 denotes a laser unit that corresponds to 40B of FIG. 4, and 52 denotes a casing. The reverse voltage generating unit 405A comprises a storage battery 53, a battery holder 54, a negative electrode conductor plate 55, a positive electrode conductor plate 56 and a stopper 57.

The storage battery 53 is a button cell. It can be an alkali storage battery such as nickel-cadmium storage battery or nickel-hydrogen storage battery, or a lithium ion storage battery. While the button cell is shown in FIG. 5A, a cylindrical storage battery may also be used.

The battery holder 54 is secured in the laser unit 51 on the bottom surface thereof, and houses the storage battery 53. The battery holder 54 also supplies the selectors 406R, 406G and 406B with the reverse voltage, that is the battery voltage across a terminal T1 that is connected to the negative electrode conductor plate 55 provided on one side thereof to contact the negative electrode of the storage battery 53 and a terminal T2 that is connected to the positive electrode conductor plate 56 provided on the other side thereof to contact the positive electrode of the storage battery 53. The negative electrode conductor plate 55 is always kept in contact with the negative electrode of the storage battery 53, that is formed in the shape of a lead spring, by the urging force thereof.

The stopper 57 is formed from an electrically insulating material such as hard resin in a T-letter shape in longitudinal section composed of a vertical section 571 and a base section 572. The vertical section 571 of the stopper 57 is inserted through an opening formed in the bottom of the casing 52 and through an opening in the bottom of the laser unit 51 into a space between the positive electrode conductor plate 56 and the positive electrode of the storage battery 53, and is held in place by the spring force of the negative electrode conductor plate 55 of the battery holder 54 which is applied via the storage battery 53. The base section 572 of the stopper 57 is kept in contact with an outer bottom surface of the casing 52.

When the laser unit 51 is separated from the casing 52 in the state described above, the positive electrode of the storage battery 53 contacts with the positive electrode conductor plate 56 of the battery holder 54 because the stopper 57 keeps the bottom 572 in contact with the outer bottom surface of the casing 52, so that the reverse voltage is generated between the terminal T1 and the terminal T2. As the reverse voltage is applied via the selectors 406R, 406G and 406B to the laser sources 401R, 401G and 401B, respectively, the laser sources 401R, 401G and 401B are destroyed.

While the storage battery 53 is used in the case shown in FIG. 5A, an electric double layer capacitor may also be used instead.

Figure 5B:
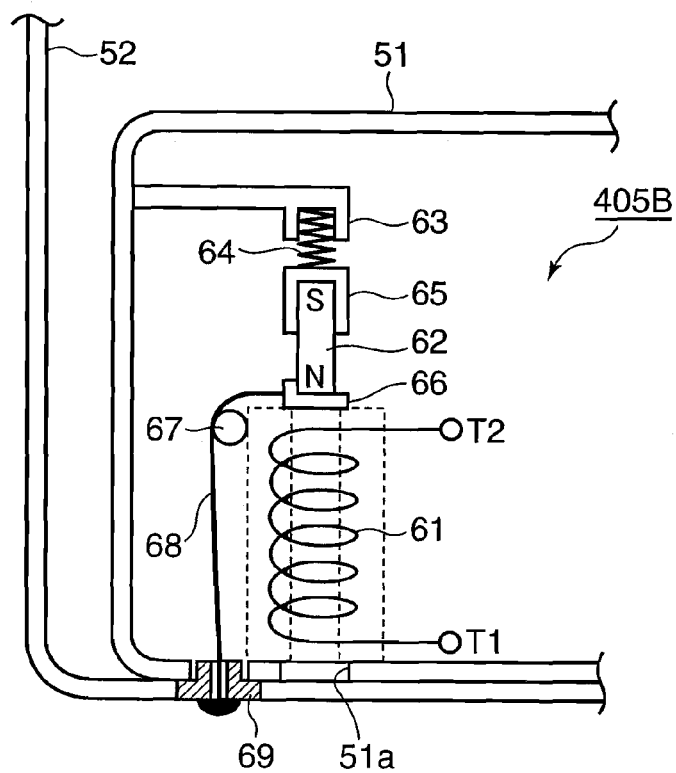
FIG. 5B shows the configuration of another example of the reverse voltage generating circuit of the projection type display apparatus according to the third embodiment of the present invention.

FIG. 5B shows the constitution of another example of the reverse voltage generating unit 405 shown in FIG. 4. In FIG. 5B, the reverse voltage generating unit 405B comprises a coil 61, a permanent magnet 62, a spring holder 63, a spring 64, a magnet holder 65, a stopper 66, a roller 67, a metal wire 68 and a wire fastener 69.

The coil 61 has the terminal T1 and the terminal T2, and is secured onto an inner bottom surface of the laser unit 51. The permanent magnet 62 is pressed downward and is restricted in the movement in the lateral direction as shown in the drawing by the magnet holder 65 that is urged by the spring 64 housed in the spring holder 63.

The stopper 66 is inserted between the top of the coil 61 and the N pole of the permanent magnet 62 and is held therein. One end of the stopper 66 is connected to one end of the metal wire 68. The metal wire 68 extends from the left downward via the roller 67, and the other end of the metal wire 68 is connected to the outer surface by soldering or the like via a hollow space of the wire fastener 69 that is fitted in loose contact with the laser unit 51 and in tight contact with the casing 52.

When the laser unit 51 is disconnected from the casing in the state described above, the stopper 66 moves to the left and moves downward due to the roller 67 because the stopper is fastened by the wire fastener 69 via the metal wire 68, to move out of the space between the N pole of the permanent magnet 62 and the top of the coil 61. The permanent magnet 62 is pushed downward by the urging force of the spring 64, so as to pass through the coil 61 and fall through the opening 51a formed in the bottom of the laser unit 51 onto the inner bottom surface of the casing 52.

When the permanent magnet 62 passes through the coil 61, an electromotive force is induced between the terminal 1 and the terminal 2 of the coil 61, that is applied as the reverse voltage via the selectors 406R, 406G and 406B to the laser sources 401R, 401G and 401B, respectively, so that the laser sources 401R, 401G and 401B are destroyed.

According to the third embodiment, as described above, the laser sources are destroyed when the laser unit is disconnected from the casing, so that the laser sources of high output power are prevented from being used in unintended purpose by a malicious person who removes the laser sources.

Fourth Embodiment

Figure 6A:
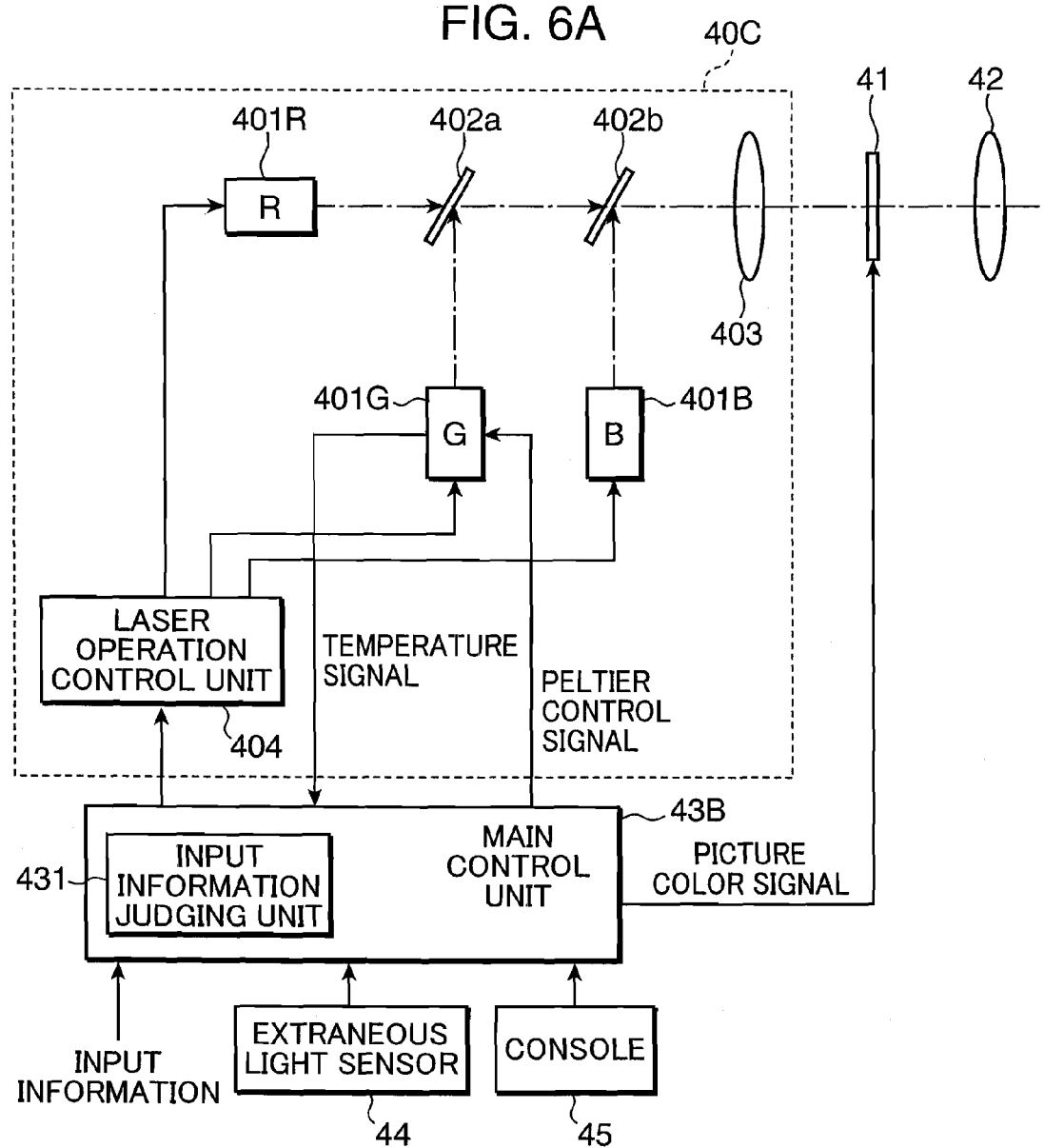
FIG. 6A shows the schematic configuration and optical path of a projection type display apparatus according to a fourth embodiment of the present invention.

FIG. 6A shows the schematic constitution and optical path of the projection type display apparatus according to the fourth embodiment of the present invention. In FIG. 6A, components identical to those shown in FIG. 4 referred to in the third embodiment will be denoted by the identical reference numerals and description thereof will be omitted.

The fourth embodiment is different from the third embodiment in such a constitution as the reverse voltage generating unit and the selectors are omitted, and the green laser source is not capable of oscillating simply by supplying power when the laser unit including the green laser source is removed. The description that follows will focus on the difference from third embodiment.

In FIG. 6A, the projection type display apparatus of the fourth embodiment comprises a laser unit 40C, the transmission type spatial light modulation element 41, the projection optics system 42, the main control unit 43B, the extraneous light sensor 44 and the console 45.

The laser unit 40C houses the laser sources 401R, 401G and 401B that are constituted from semiconductor lasers of the three primary colors, the dichroic mirrors 402a, 402b, the illumination optics system 403 and the laser operation control unit 404. The green laser source 401G which characterizes the constitution of the fourth embodiment will be described below.

Figure 6B:
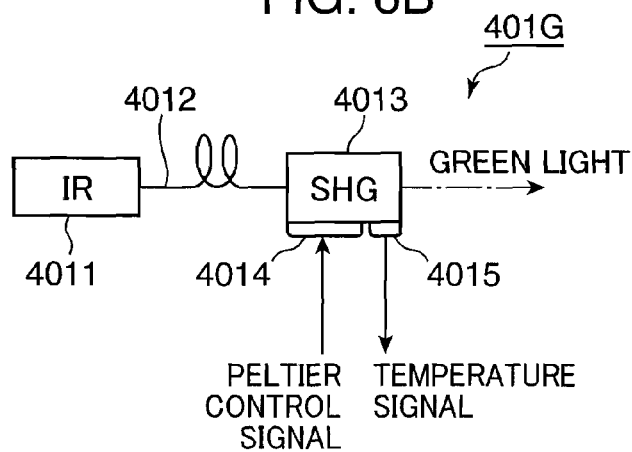
FIG. 6B shows the configuration of a green laser source of the projection type display apparatus according to the fourth embodiment of the present invention.

FIG. 6B shows the configuration of the green laser source 401G of FIG. 6A. In FIG. 6B, the green laser source 401G comprises an infrared semiconductor laser (IR) 4011, a rare earth-doped optical fiber 4012, a second harmonics generator element (SHG) 4013, a Peltier element 4014 and a temperature sensor 4015.

The infrared semiconductor laser 4011 is a semiconductor laser that emits a laser beam in the infrared range having wavelength of, for example, 915 nm used for excitation. The rare earth-doped optical fiber 4012 is made of a material doped with ytterbium, for example, as the rare earth element, so that the rare earth element is excited by the infrared laser beam emitted by the infrared semiconductor laser 4011, so as to emit laser beam having wavelength of 1064 nm. The second harmonics generator element 4013 receives the infrared laser beam amplified by the rare earth-doped optical fiber 4012 and transforms it into a green laser beam that is the second harmonics and is emitted therefrom. The second harmonics generator element 4013 is constituted so as to match the phase of the laser beam at a predetermined temperature lower than the normal temperature, thereby to efficiently convert the wavelength. The Peltier element 4014 cools down the second harmonics generator element 4013 to a predetermined temperature according to a Peltier element control signal sent from the main control unit 43B. The temperature sensor 4015 senses the temperature of the second harmonics generator element 4013 and sends a temperature signal that indicates the temperature that has been sensed to the main control unit 43B. The main control unit 43B controls the temperature by sending the Peltier element control signal to the Peltier element 4015 to control the second harmonics generator element 4013 to the predetermined temperature lower than the normal temperature according to the temperature signal sent from the temperature sensor 4015.

When the laser unit 40C including the green laser source 401G having the constitution described above is taken out of the apparatus, the main control unit 43B does not control the temperature of the second harmonics generator element 4013 and the second harmonics generator element 4013 does not carry out phase matching, and therefore laser oscillation of the green laser source 401G remains shut down.

According to the fourth embodiment, as described above, the green laser source 401G is not capable of oscillating because the second harmonics generator element 4013 is not controlled to the low temperature that enables phase matching when the green laser source 401G is removed from the projection type display apparatus. Therefore, the laser source of high output power is prevented from being used in unintended purpose by a malicious person who removes the laser source.

Fifth Embodiment

Figure 7A:
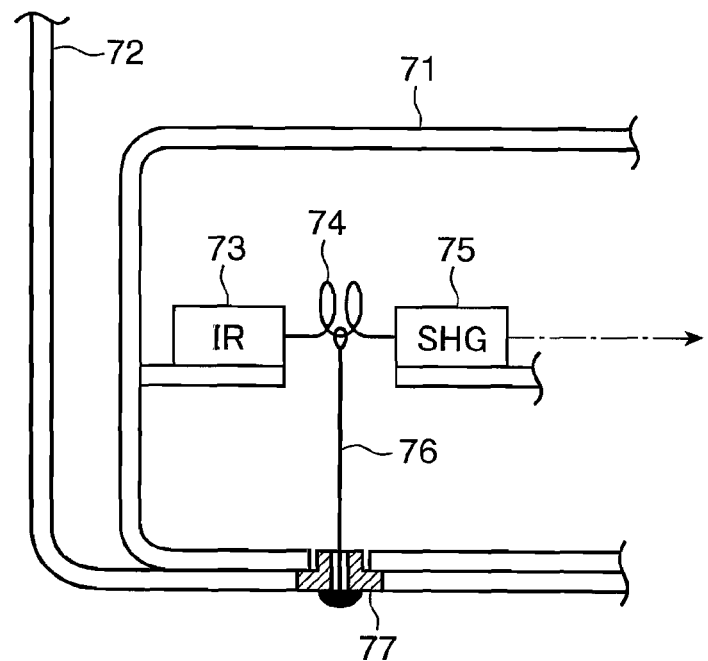
FIG. 7A shows a partial configuration of a projection type display apparatus according to a fifth embodiment of the present invention with a laser unit secured onto a casing.

FIG. 7A shows partial configuration of the projection type display apparatus according to the fifth embodiment of the present invention with the laser unit secured onto the casing. The fifth embodiment is different from the fourth embodiment in such a configuration as the Peltier element and the temperature sensor of the green laser source are omitted, and the green laser source is disabled to oscillate by cutting off the rare earth-doped optical fiber when the laser unit including the green laser source is removed from the apparatus. The description that below will focus on the difference from the fourth embodiment.

In FIG. 7A, the laser unit 71 comprises a green laser source constituted from an infrared semiconductor laser 73, a rare earth-doped optical fiber 74 and a second harmonics generator element 75, a metal wire 76 and a wire fastener 77, and is secured onto the inner bottom surface of a casing 72. The metal wire 76 has a ring at one end thereof through which the rare earth-doped optical fiber 74 passes, while the other end is connected to the outer surface by soldering or the like via a hollow space of the wire fastener 77. The metal wire 76 has strength sufficiently higher than the strength of the rare earth-doped optical fiber 74. The wire fastener 77 has a configuration and function similar to those of the wire fastener 69 shown in FIG. 5B referred to in the third embodiment.

Figure 7B:
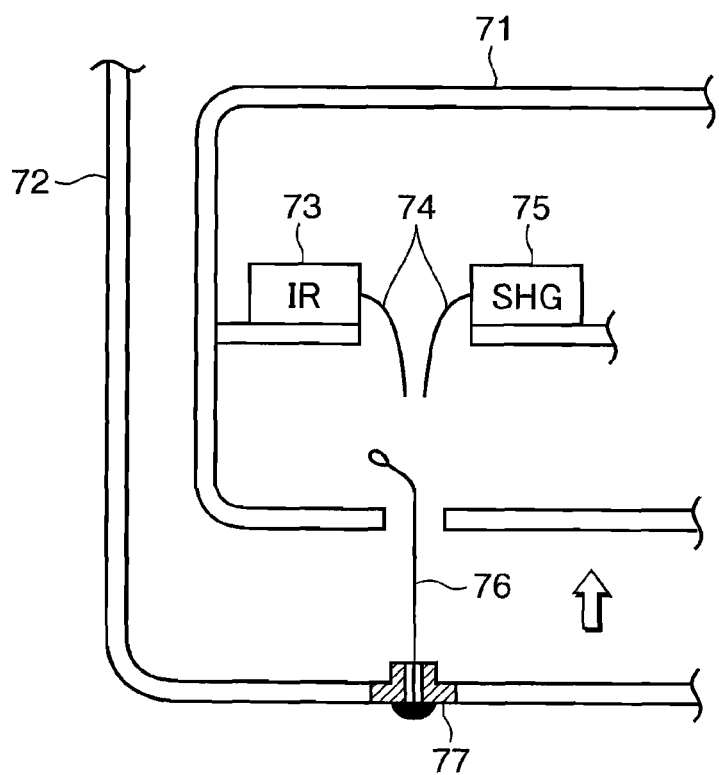
FIG. 7B shows the partial configuration of the projection type display apparatus according to the fifth embodiment of the present invention with the laser unit separated from the casing.

FIG. 7B shows partial configuration of the apparatus wherein the laser unit 71 shown in FIG. 7A is removed from the casing 72. In FIG. 7B, components having the configuration and function identical to those shown in FIG. 7A will be denoted using the same reference numerals and descriptions thereof will be omitted.

When the laser unit 71 is disconnected from the casing 72, since the metal wire 76 is fastened by the wire fastener 77 as shown in FIG. 7B, the ring provided on one end of the metal wire 76 cuts off the rare earth-doped optical fiber 74.

According to the fifth embodiment, as described above, when the laser unit 71 is removed from the casing 72, a part of the rare earth-doped optical fiber 74 that is fastened indirectly onto the casing 72, namely via the metal wire 76 and the wire fastener 77, is cut off to disable the green laser source to oscillate. Therefore, the laser source of high output power is prevented from being used in unintended purpose by a malicious person who removes the laser source.

Sixth Embodiment

Figure 8A:
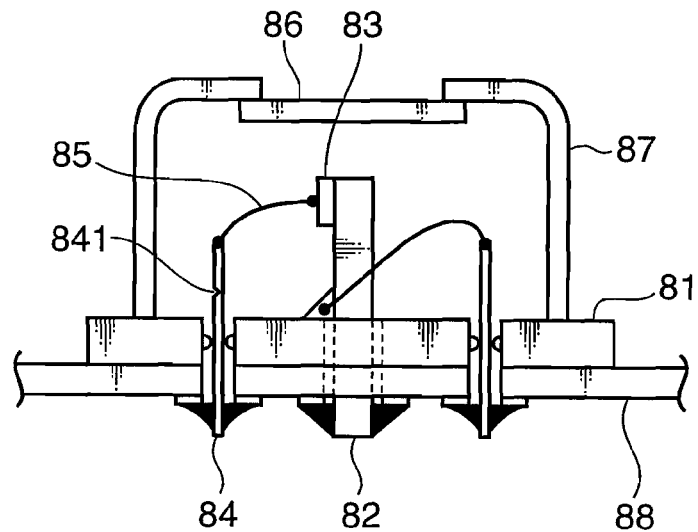
FIG. 8A is a sectional view of a projection type display apparatus according to a sixth embodiment of the present invention showing a semiconductor laser of can type soldered onto a wiring board.

FIG. 8A is a sectional view of a projection type display apparatus according to sixth embodiment of the present invention showing a semiconductor laser of can type soldered onto a wiring board. The semiconductor laser of the sixth embodiment is applied to the laser sources of the three primary colors of the first to third embodiments and to the red laser source and the blue laser source of the fourth and fifth embodiments.

In FIG. 8A, the laser source is configuration from a semiconductor laser of can type made by fastening the N side of a PN junction of a laser diode chip 83 on a common terminal 82 that is connected to a stem 81, and the P side of the laser diode chip 83 and a power terminal 84 that penetrates through the stem 81 are internally connected via a metal wire 85, while a cap 87 having a window 86 is mounted on the stem 81 and the laser diode chip 83 is sealed. The semiconductor laser is mounted by inserting three terminals including the common terminal 82 and the power terminal 84 through corresponding holes of a wiring board 88, and soldering the terminals onto wiring lands provided on the back side of the wiring board 88.

The power terminal 84 has a notch 841 formed to weaken the strength of the power terminal 84 at a position located inside of the semiconductor laser.

Figure 8B:
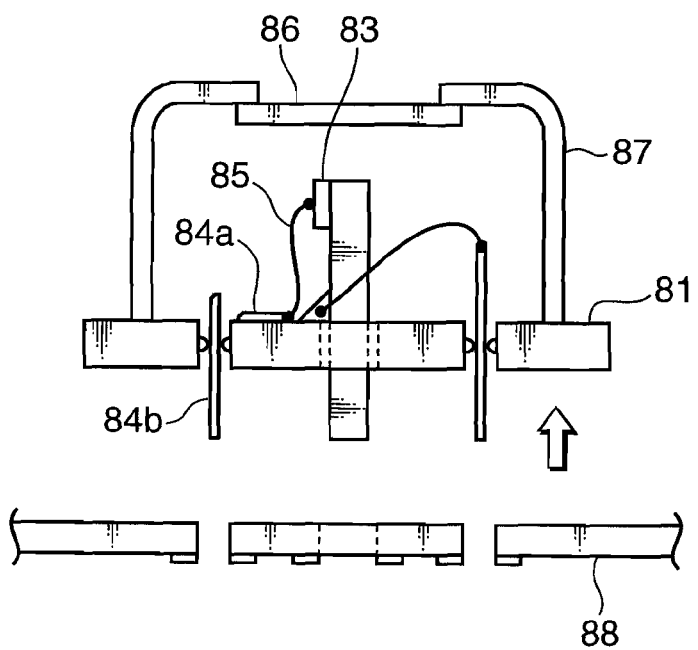
FIG. 8B is a sectional view of the projection type display apparatus according to the sixth embodiment of the present invention showing the semiconductor laser of can type removed from the wiring board.

FIG. 8B is a sectional view of the projection type display apparatus according to the sixth embodiment of the present invention showing the semiconductor laser of can type removed from the wiring board.

As shown in FIG. 8B, the power terminal 84 is cut off by an external force acting on the notch 841 of the power terminal 84, as the solder that bonds the three terminals of the semiconductor laser onto the wiring lands provided on the back side of the wiring board 88 is melted by heating and removed thereby causing the semiconductor to come free from the wiring board 88.

The effect of the sixth embodiment is enhanced further by forming only the power terminal 84, among the three terminals of the semiconductor laser, from a metallic material that has lower strength than the metallic material used to form the other terminals.

According to the sixth embodiment, as described above, since an external force applied to cause the semiconductor to come free from the wiring board 88 thereby cutting off the power terminal 84 of the semiconductor laser in the laser to make it impossible to supply power to the semiconductor laser. The laser source of high output power is thus prevented from being used in unintended purpose by a malicious person who removes the laser source.

Seventh Embodiment

Figure 9A:
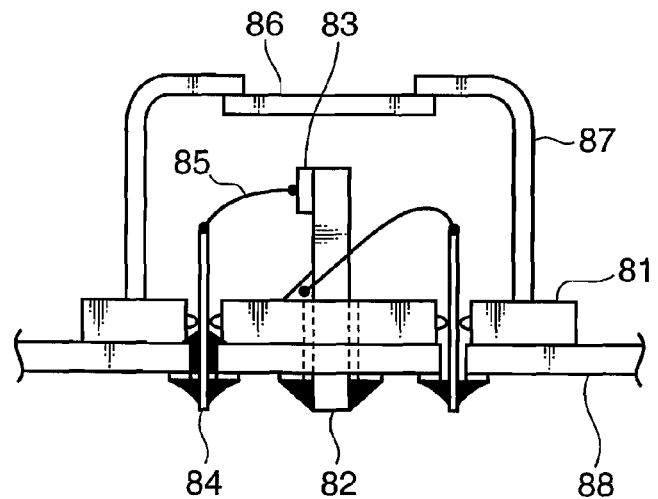
FIG. 9A is a sectional view of a projection type display apparatus according to a seventh embodiment of the present invention showing a semiconductor laser of can type soldered onto a wiring board.

FIG. 9A is a sectional view of a projection type display apparatus according to seventh embodiment of the present invention showing a semiconductor laser of can type soldered onto a wiring board. In FIG. 9A, components having the configuration identical to that shown in FIG. 8A referred to in the sixth embodiment will be denoted using the same reference numerals and descriptions thereof will be omitted. The semiconductor laser of the seventh embodiment is applied to the laser sources of the three primary colors of the first to third embodiments and to the red laser source and the blue laser source of the fourth and fifth embodiments, similarly to the sixth embodiment.

The seventh embodiment is different from the sixth embodiment in the constitution of the power terminal and the way it is connected to the wiring board.

Now making reference to FIG. 9A, a thermosetting or ultraviolet-hardened resin material 92 is applied only in and around an insertion hole for the power terminal 91 of the semiconductor laser on the surface of the wiring board, while the three terminals of the semiconductor laser are inserted into respective holes of the wiring board 88, and the power terminal 84 is secured onto the wiring board 88 by heating the resin material 92 or irradiating it with ultraviolet rays. This causes the power terminal 91 to be held by the resin material 92 of the wiring board 88 with a force greater than the force with which the stem 81 holds the power terminal 91.

Figure 9B:
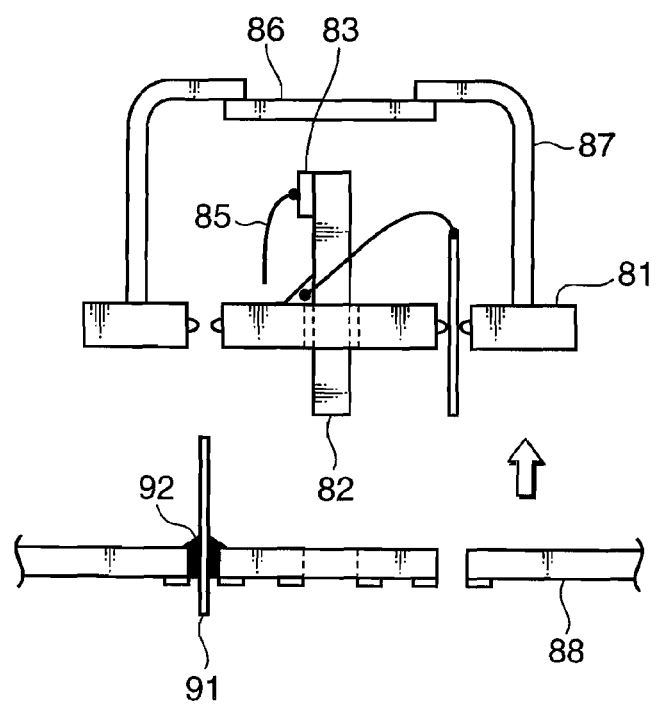
FIG. 9B is a sectional view of the projection type display apparatus according to the seventh embodiment of the present invention showing the semiconductor laser of can type removed from the wiring board.

FIG. 9B is a sectional view of a projection type display apparatus according to seventh embodiment of the present invention showing a semiconductor laser of can type removed from the wiring board. When the semiconductor laser is removed from the wiring board 88, as shown in FIG. 9B, the power terminal 91 comes free from the laser unit and remains on the wiring board 88 since the force with which the wiring board 88 holds the power terminal 91 is greater than the force with which the stem 81 holds the power terminal 91, to make it impossible to supply power to the semiconductor laser, thereby making it possible to prevent the laser source of high output power from being used in unintended purpose by a malicious person who removes the laser source.

Eighth Embodiment

The eighth embodiment of the present invention concerns the method of setting the numerical aperture B on the image side of the illumination optics system of the first to seventh embodiments. In general, as the numerical aperture of an optics system increases beyond 0.25, the lens system becomes complicated and the lenses become larger. In order to make a compact projection type display apparatus at a low cost, the numerical aperture B on the image side of the illumination optics system is set to 0.25 or lower in the eighth embodiment. Setting the numerical aperture B on the image side of the illumination optics system to 0.25 or lower means that the intensity of laser beam on the spatial light modulation element is not greater than 43 mW/mm$^2$, based on Equation 5 derived in the first embodiment. As a result, a safe projection type display apparatus that is capable of preventing impairment of the retina in conjunction with the human reflex movement can be provided.

While images are displayed by focusing, by means of the projection lens, the laser beam modulated in accordance to the color signals of the image transmitted to the spatial light modulation element in the first to eighth embodiments of the present invention, the projection type display apparatus of the present invention includes a projection type display apparatus that provides color display with the laser source and the illumination optics system only and a projection type display apparatus that illuminates a liquid crystal panel with color regardless of the presence of the spatial light modulation element.

Characteristic configurations of the present invention will be summarized below.

The projection type display apparatus of the present invention comprises at least one laser source, the illumination optics system that irradiates the laser beam emitted by the laser source, at least one spatial light modulation element that modulates the intensity of the laser beam irradiated from the illumination optics system in accordance to input information, the projection optics system that projects the laser beam modulated by the spatial light modulation element onto the screen and the laser operation control unit that controls the output power of the at least one laser source so that intensity A (mW/mm$^2$) of the laser beam satisfies the relationship of A<686×B$^2$ on the spatial light modulation element.

According to this configuration, the safe projection type display apparatus that is capable of preventing impairment of the retina in conjunction with the human reflex movement can be provided if the intensity A (mW/mm$^2$) of the laser beam satisfies the relationship of A (686×B$^2$ on the spatial light modulation element.

In the projection type display apparatus of the present invention, it is preferable that at least one laser source is constituted from N laser sources that emit N laser beams of different wavelengths, and at least one spatial light modulation element is one spatial light modulation element that modulates the intensity of the N laser beams having different wavelengths irradiated from the illumination optics system in accordance to input information.

According to this configuration, the projection type display apparatus in which the N laser beams of different wavelengths emitted by the N laser sources are modulated by one spatial light modulation element according to the input information and are projected onto the screen can be provided.

In the projection type display apparatus of the present invention, it is preferable that the at least one laser source is configured from N laser sources that emit N laser beams of different wavelengths, and at least one spatial light modulation element is constituted from N spatial light modulation elements that modulate the intensities of the N laser beams having different wavelengths irradiated from the illumination optics system in accordance to the each input information.

According to this constitution, the projection type display apparatus in which the N laser beams of different wavelengths emitted by the N laser sources are modulated by N spatial light modulation elements according to the input information and are projected onto the screen can be provided.

In the projection type display apparatus of the present invention, it is preferable that the laser operation control unit has the first power control mode where the output powers of the N laser beams are set so that the total intensity A of the N laser beams of different wavelengths on the spatial light modulation element satisfies the relationship of A<686×B$^2$.

With this configuration, the projection type display apparatus that is capable of preventing impairment of the retina in conjunction with the human reflex movement and allows easy control of the color balance between light components of different wavelengths can be provided.

In the projection type display apparatus of the present invention, it is preferable that the laser operation control unit has the second power control mode in which the output power of the laser source that emits the laser beam of the wavelength that has the highest luminous efficiency among the N laser beams of different wavelengths is set so that the intensity A of the laser beam of the wavelength that has the highest luminous efficiency on the spatial light modulation element satisfies the relationship $A<686\times B^2$, and the oscillations of the other laser sources are shut down.

With this configuration, the projection type display apparatus that is capable of preventing impairment of the retina in conjunction with the human reflex movement and has improved contrast and higher luminance, although the picture is monochromatic (green), can be provided.

The projection type display apparatus of the present invention also preferably has the input information judging unit that determines whether the input information is video information or character information so that, when the input information judging unit determines that the input information is video information, the laser operation control unit selects the first power control mode and, when the input information judging unit determines that the input information is character information, the laser operation control unit selects the second power control mode.

This configuration makes it possible to determine, in the input information judging unit, whether the input information is video information or character information and, according to the decision, automatically select either video display of good color balance or character display of good contrast.

The projection type display apparatus of the present invention is also preferably provided with the extraneous light sensor that measures the luminance of the light components having the different wavelengths included in the extraneous light, and has the third power control mode in which the laser operation control unit decreases the output power of the laser source that emits the laser beam of the wavelength equal to the wavelength of the light component showing the highest luminance as detected by the extraneous light sensor, among the different wavelengths of the N laser beams, in accordance to the luminance detected by the extraneous light sensor.

With this configuration, the projection type display apparatus having contrast improved in accordance to the color balance of the extraneous light can be provided.

The projection type display apparatus of the present invention also preferably has the console that allows the user to enter instructions, and the laser operation control unit selects the first power control mode, the second power control mode or the third power control mode in accordance to the instruction entered by the user through the console.

This configuration makes it possible for the user to enter the instruction via the console so as to freely select either video display of good color balance or character display of good contrast, whether to display video image and/or characters with the contrast improved in accordance to the color balance of the extraneous light.

In the projection type display apparatus of the present invention, it is preferable that the numerical aperture B of the illumination optics system is set to not higher than 0.25, so that the intensity A of the laser beam on the spatial light modulation element is not greater than 43 mW/mm².

With this configuration, in general, as the numerical aperture of the optics system increases beyond 0.25, the lens system becomes complicated and the lenses become larger, although the compact projection type display apparatus that is capable of preventing impairment of the retina in conjunction with the human reflex movement can be provided at a low cost, by setting the numerical aperture B on the image side of the illumination optics system to not higher than 0.25, so that the intensity A of the laser beam on the spatial light modulation element is not greater than 43 mW/mm².

In the projection type display apparatus of the present invention, it is preferable that the illumination optics system includes the beam homogenizer that makes the intensity distribution of the laser beam uniform and the relay optics system, that projects the laser beam which has been conditioned to have a uniform intensity distribution by the beam homogenizer, onto the spatial light modulator element. In this case, it is preferable that the illumination optics system includes a diffuser plate.

This constitution makes it possible to condition the laser beam that has been emitted by the laser source to have a uniform intensity distribution of rectangular or linear profile and irradiate the spatial light modulation element with the laser beam of highly uniform luminance.

It is further preferable that the projection type display apparatus of the present invention has the laser unit that houses at least the laser sources and the illumination optics system, the casing that houses at least the laser unit, the spatial light modulation element and the projection optics system, the reverse voltage generating unit that generates a reverse voltage that is equal to or higher than the breakdown voltage of the laser sources and applies the voltage to the laser sources when the laser unit is disconnected from the casing, and the selector that connects the laser source to the laser operation control unit when the laser source is operating and connects the laser source to the reverse voltage generating unit when the laser source is not operating. In this case, it is preferable that the laser source is constituted from semiconductor laser or semiconductor laser-excited solid state laser, and the breakdown voltage is preferably the reverse voltage that is higher than the maximum rated reverse voltage of the semiconductor laser.

This constitution makes it possible to prevent the laser source of high output power from being used in unintended purpose by a malicious person who removes the laser source, by destroying the laser source when the laser unit is disconnected from the casing.

In the projection type display apparatus of the present invention, it is preferable that the reverse voltage generating unit includes a storage battery or an electric double layer capacitor and the charge voltage of the storage battery or the electric double layer capacitor is applied as the reverse voltage to the laser source.

This configuration enables it to easily generate the reverse voltage that destroys the laser source.

In the projection type display apparatus of the present invention, it is preferable that the reverse voltage generating unit includes the coil and the permanent magnet that moves through the coil and induces a voltage across the coil when the laser unit is disconnected from the casing, so that the voltage induced across the coil is applied to the laser source as the reverse voltage.

This configuration enables it to easily generate the reverse voltage that destroys the laser source.

In the projection type display apparatus of the present invention, it is preferable that at least one laser source includes the green laser source having the semiconductor laser that emits infrared ray used in excitation, the rare earth-doped optical fiber of which rare earth element component is excited by the semiconductor laser, the second harmonics generator element that transforms the infrared ray emitted by the rare earth-doped optical fiber into green light, the Peltier element that cools the second harmonics generator element down to a predetermined temperature lower than the normal temperature, and the temperature sensor that senses the temperature of the second harmonics generator element, wherein the second harmonics generator element is configured to carry out phase matching at the predetermined temperature.

With this configuration, when the green laser source is removed from the projection type display apparatus, the second harmonics generator element is not controlled to the low temperature that enables phase matching and therefore the green laser source is not capable of oscillating so that the laser source of high output power is prevented from being used in an unintended purpose by a malicious person who removes the laser source.

In the projection type display apparatus of the present invention, it is preferable that at least one laser source includes the green laser source having the semiconductor laser that emits infrared ray used in excitation, the rare earth-doped optical fiber of which rare earth element is optically excited by the semiconductor laser and the second harmonics generator element that transforms the infrared ray emitted by the rare earth-doped optical fiber into green light, and the projection type display apparatus is further provided with the laser unit that houses at least the laser sources and the illumination optics system, and the casing that houses at least the laser unit, the spatial light modulation element and the projection optics system, while a part of the rare earth-doped optical fiber is fastened indirectly onto the casing via the opening formed in the laser unit, so that the fiber is cut off when the laser unit is removed from the casing.

With this configuration, when the laser unit is removed from the projection type display apparatus, the green laser source is not capable of oscillating because the part of the rare earth-doped optical fiber fastened indirectly onto the casing is cut off so that the laser source of high output power is prevented from being used in an unintended purpose by a malicious person who removes the laser source.

In the projection type display apparatus of the present invention, it is preferable that the laser source is the semiconductor laser of can type made by fastening the N side of the PN junction of the laser diode chip on the common terminal that is connected to the stem, internally connecting the P side of the laser diode chip and the power terminal that penetrates through the stem, mounting the cap having a window on the stem and sealing the laser diode chip, while the power terminal has a portion of lower strength inside of the laser, so as to become impossible to supply power to the laser diode chip when the semiconductor laser is removed from the wiring board. In this case, it is preferable that the power terminal has a notch so that the power terminal is cut off by an external force applied thereto.

With this configuration, it becomes impossible to supply power to the semiconductor laser since the power terminal is cut off by an external force applied thereto when the semiconductor laser is removed from the wiring board, so that the laser source of high output power is prevented from being used in an unintended purpose by a malicious person who removes the laser source.

In the projection type display apparatus of the present invention, it is preferable that the laser source is the semiconductor laser of can type made by fastening the N side of the PN junction of the laser diode chip on the common terminal that is connected to the stem, internally connecting the P side of the laser diode chip and the power terminal that penetrates through the stem, mounting the cap having a window on the stem and sealing laser diode chip, and the power terminal is secured by the wiring board with a force greater than the force with which the stem holds the power terminal by heating the portion of the wiring board where the power terminal is inserted or irradiating it with ultraviolet rays, so as to become impossible to supply power to the laser diode chip when the semiconductor laser is removed from the wiring board.

With this configuration, it becomes impossible to supply power to the semiconductor laser since the power terminal is fastened onto the wiring board with a force greater than the force with which the stem holds the power terminal so that the power terminal comes off the laser and remains on the wiring board when the semiconductor laser is removed from the wiring board, so that the laser source of high output power is prevented from being used in unintended purpose by a malicious person who removes the laser source.

INDUSTRIAL APPLICABILITY

The projection type display apparatus of the present invention is capable of ensuring high level of safety for the eye in conjunction with the avoiding reaction based on the human reflex movement upon exposure of the eye to the laser beam when the laser source is operating, and preventing the laser source of high output power from being used in an unintended purpose by a malicious person who removes the laser source when the laser source is not operating.

The invention claimed is:
1. A projection type display apparatus comprising:
at least one laser source;
an illumination optics system that irradiates a laser beam emitted by the at least one laser source;
at least one spatial light modulation element that modulates an intensity of the laser beam irradiated from the illumination optics system in accordance with input information;
a projection optics system that projects the laser beam modulated by the at least one spatial light modulation element onto a screen; and
a laser operation control unit that sets the output power of the at least one laser source so that an intensity A (mW/mm$^2$) of the laser beam on the at least one spatial light modulation element satisfies the following relationship when a numerical aperture B of the illumination optics system is set:

$$A < 686 \times B^2.$$

2. The projection type display apparatus according to claim 1,
wherein the at least one laser source is constituted from N laser sources that emit N laser beams of different wavelengths, and
wherein the at least one spatial light modulation element is one spatial light modulation element that modulates the intensities of the N laser beams of different wavelengths irradiated from the illumination optics system in accordance with the input information.

3. The projection type display apparatus according to claim 1,
wherein the at least one laser source is constituted from N laser sources that emit N laser beams of different wavelengths, and
wherein the at least one spatial light modulation element is constituted from N spatial light modulation elements that modulate the intensities of the N laser beams of different wavelengths irradiated from the illumination optics system in accordance with the input information.

4. The projection type display apparatus according to claim 2, wherein the laser operation control unit has a first power control mode in which the output powers of the N laser sources are set so that a total intensity A of the N laser beams of different wavelengths on the spatial light modulation element satisfies the relationship of $A<686\times B^2$.

5. The projection type display apparatus according to claim 4, wherein the laser operation control unit has a second power control mode in which the output power of a laser source that emits the laser beam of the wavelength having the highest luminous efficiency among the N laser beams of different wavelengths is set so that an intensity A of the laser beam of the wavelength having the highest luminous efficiency on the spatial light modulation element satisfies the relationship of $A<686\times B^2$, and oscillations of the other laser sources are shut down.

6. The projection type display apparatus according to claim 5, further comprising an input information judging unit that determines whether the input information is video information or character information,
wherein the laser operation control unit selects the first power control mode when the input information judging unit determines that the input information is video information, and selects the second power control mode when the input information judging unit determines that the input information is character information.

7. The projection type display apparatus according to claim 5, further comprising an extraneous light sensor that measures a luminance of light components of different wavelengths included in extraneous light,
wherein the laser operation control unit has a third power control mode in which the laser operation control unit decreases the output power of a laser source that emits the laser beam having the wavelength, among the different wavelengths of the N laser beams, that corresponds to the wavelength of the highest luminance detected by the extraneous light sensor, in accordance to the luminance detected by the extraneous light sensor.

8. The projection type display apparatus according to claim 7, further comprising a console through which a user's instruction is entered,
wherein the laser operation control unit selects either the first power control mode, the second power control mode or the third power control mode, in accordance to the instruction entered by the user through the console.

9. The projection type display apparatus according to claim 1, wherein the numerical aperture B of the illumination optics system is not higher than 0.25, and the intensity A of the laser beam on the at least one spatial light modulation element is not greater than 43 mW/mm$^2$.

10. The projection type display apparatus according to claim 1, wherein the illumination optics system includes a beam homogenizer that makes an intensity distribution of the laser beam uniform, and a relay optics system that projects the laser beam, which has been conditioned to have a uniform intensity distribution by the beam homogenizer, onto the at least one spatial light modulation element.

11. The projection type display apparatus according to claim 1, wherein the illumination optics system includes a diffuser plate.

12. The projection type display apparatus according to claim 1, further comprising:
a laser unit that houses at least the at least one laser source and the illumination optics system;
a casing that houses at least the laser unit, the at least one spatial light modulation element, and the projection optics system;
a reverse voltage generating unit that generates a reverse voltage that is equal to or higher than a breakdown voltage of the at least one laser source, and applies the reverse voltage to the at least one laser source when the laser unit is disconnected from the casing; and
a selector that connects the at least one laser source to the laser operation control unit when the at least one laser source is operating, and connects the at least one laser source to the reverse voltage generating unit when the laser source is not operating.

13. The projection type display apparatus according to claim 12,
wherein the laser source includes a semiconductor laser or a semiconductor laser-excited solid state laser, and
wherein the breakdown voltage is a reverse voltage that is higher than the maximum rated reverse voltage of the semiconductor laser.

14. The projection type display apparatus according to claim 12, wherein the reverse voltage generating unit includes a storage battery or an electric double layer capacitor, and applies a charge voltage of the storage battery or the electric double layer capacitor as the reverse voltage to the at least one laser source.

15. The projection type display apparatus according to claim 12, wherein the reverse voltage generating unit includes a coil and a permanent magnet that moves through the coil and induces a voltage across the coil when the laser unit is disconnected from the casing, and applies the voltage induced across the coil to the at least one laser source as the reverse voltage.

16. The projection type display apparatus according to claim 1,
wherein the at least one laser source includes:
a green laser source having a semiconductor laser that emits infrared ray used in excitations;
a rare earth-doped optical fiber of which a rare earth element component is optically excited by the semiconductor laser;
a second harmonics generator element that transforms the infrared ray emitted by the rare earth-doped optical fiber into green light;
a Peltier element that cools down the second harmonics generator element to a predetermined temperature lower than a normal temperature; and
a temperature sensor that senses the temperature of the second harmonics generator element, and
wherein the second harmonics generator element carries out phase matching at the predetermined temperature.

17. The projection type display apparatus according to claim 1,
wherein the at least one laser source includes:
a green laser source having a semiconductor laser that emits infrared ray used in excitation;
a rare earth-doped optical fiber of a which rare earth element component is optically excited by the semiconductor laser; and
a second harmonics generator element that transforms the infrared ray emitted by the rare earth-doped optical fiber into green light,
wherein the projection type display apparatus further comprises:
a laser unit that houses at least the at least one laser source and the illumination optics system; and
a casing that houses at least the laser unit, the spatial light modulation element, and the projection optics system, and
wherein a part of the rare earth-doped optical fiber is fastened indirectly onto the casing via an opening formed in the laser unit so as to be cut off when the laser unit is removed from the casing.

18. The projection type display apparatus according to claim 1,
- wherein the at least one laser source is a semiconductor laser made by fastening the N side of a PN junction of a laser diode chip on a common terminal that is connected to a stem, internally connecting the P side of the laser diode chip and a power terminal that penetrates through the stem with a metal wire, mounting a cap having a window on the stem, and sealing the laser diode chip, and
- wherein a strength of the power terminal is made weaker in a portion thereof located inside of the at least one laser source so as to become impossible to supply power to the laser diode chip when the semiconductor laser is removed from a wiring board.

19. The projection type display apparatus according to claim 18, wherein the power terminal has a notch so that the power terminal is cut off inside of the at least one laser source by an external force applied thereto.

20. The projection type display apparatus according to claim 1,
- wherein the laser source is a semiconductor laser made by fastening the N side of a PN junction of a laser diode chip on a common terminal that is connected to a stem, internally connecting the P side of the laser diode chip and a power terminal that penetrates through the stem with a metal wire, mounting a cap having a window on the stem, and sealing the laser diode chip, and
- wherein the power terminal is held by the wiring board with a force greater than a force with which the stem holds the power terminal, by heating a portion of the wiring board where the power terminal is inserted or irradiating the portion with ultraviolet rays, so as to become impossible to supply power to the laser diode chip when the semiconductor laser is removed from the wiring board.

* * * * *